US008902041B2

(12) United States Patent
Lai et al.

(10) Patent No.: US 8,902,041 B2
(45) Date of Patent: Dec. 2, 2014

(54) SYSTEM AND METHOD FOR UNLOCKING AN ELECTRONIC DEVICE

(75) Inventors: Hsin-Chang Lai, New Taipei (TW); Han-Zen Chang, New Taipei (TW); Liu-Wei Wu, New Taipei (TW); Jiun-Ru Hou, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 136 days.

(21) Appl. No.: 13/585,769

(22) Filed: Aug. 14, 2012

(65) Prior Publication Data

US 2013/0176105 A1 Jul. 11, 2013

(30) Foreign Application Priority Data

Jan. 10, 2012 (TW) .................................. 101100893

(51) Int. Cl.
*G05B 19/00* (2006.01)

(52) U.S. Cl.
USPC ........... 340/5.51; 340/5.1; 340/5.2; 340/5.54; 345/156; 345/158

(58) Field of Classification Search
CPC ...... H04W 12/06; G06F 3/017; G06F 3/0346; G06F 1/1626; G06F 3/011
USPC ...................... 340/967, 467, 669, 686.1, 689; 345/156, 158; 455/411, 418, 419; 348/208.1, 208.2; 702/150–153
See application file for complete search history.

(56) References Cited

U.S. PATENT DOCUMENTS

| 2007/0259685 A1* | 11/2007 | Engblom et al. ........... 455/550.1 |
| 2008/0117072 A1* | 5/2008 | Hallbert et al. ............... 340/670 |
| 2009/0088204 A1* | 4/2009 | Culbert et al. ............. 455/556.1 |
| 2010/0138364 A1* | 6/2010 | Cruz et al. ........................ 706/2 |
| 2010/0325721 A1* | 12/2010 | Bandyopadhyay et al. .... 726/19 |
| 2011/0088086 A1* | 4/2011 | Swink et al. ...................... 726/7 |

* cited by examiner

*Primary Examiner* — Brian Zimmerman
*Assistant Examiner* — Laura Nguyen
(74) *Attorney, Agent, or Firm* — Novak Druce Connolly Bove + Quigg LLP

(57) ABSTRACT

In a method for unlocking an electronic device, unlocking operation having motion units are preset and are stored into a storage system. Sampled unlocking operation is stored into the storage system. When the electronic device receives a preset unlocking command to start unlocking the electronic device, three-axis acceleration values and three-axis rotation vectors are obtained continuously as an input operation from a first sensor and a second sensor. Motion units of the input operation are recorded. Sampled input operation is obtained by sampling the input operation at a preset time interval. A membership degree of the input operation is calculated. When the membership degree of the input operation conforms to a preset unlocking threshold, the electronic device is unlocked.

15 Claims, 4 Drawing Sheets

SYSTEM AND METHOD FOR UNLOCKING AN ELECTRONIC DEVICE

BACKGROUND

1. Technical Field

Embodiments of the present disclosure relate to unlocking technology, and more particularly to a system and method for unlocking an electronic device.

2. Description of Related Art

Most electronic devices (e.g. mobile phones) may be unlocked by pressing a preset key or keys combination on keyboards of the electronic devices, or by implementing a slide unlocking gesture on touch screens of the electronic devices. However, keys of the electronic device may be easily worn because of frequent use of the preset key or keys combination, or the touch screens may be easily scratched because of frequent touch on the touch screens. That is, the above-mentioned unlocking methods may damage hardware (e.g. the keys or touch screen) of the electronic device. Furthermore, the above-mentioned unlocking methods may easily be recognized by unauthorized users, allowing personal information on the electronic device to be viewed.

DETAILED DESCRIPTION

Figure 1:
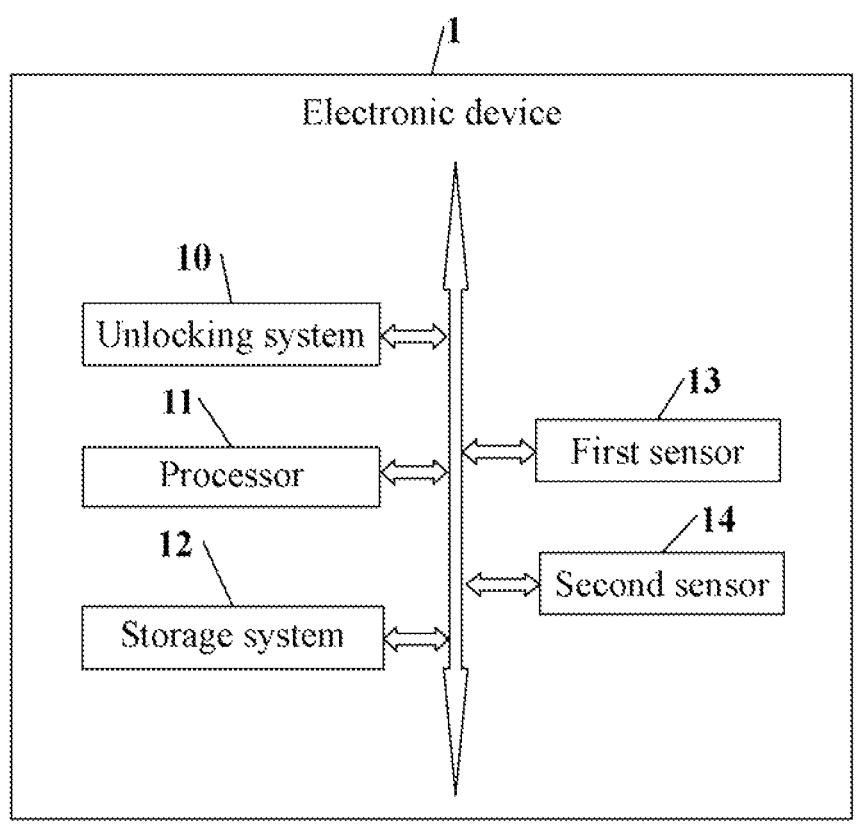
FIG. 1 is a block diagram of one embodiment of an electronic device including an unlocking system.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one."

In general, the word "module" as used herein refers to logic embodied in hardware or firmware, or to a collection of software instructions, written in a programming language, such as, Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media include compact discs (CDs), digital versatile discs (DVDs), Blu-ray disks, flash memory, and hard disk drives.

FIG. 1 is a block diagram of one embodiment of an electronic device 1. The electronic device includes an unlocking system 10. The electronic device 1 further includes at least one processor 11, a storage system 12, a first sensor 13 and a second sensor 14. In one embodiment, the first sensor 13 is a three-axis acceleration sensor that detects three-axis acceleration values of the electronic device 1, such as the three-axis acceleration values along an x-axis, a y-axis, and a z-axis of a preset coordinate system of the electronic device 1. The second sensor 14 is a three-axis gyroscope that detects three-axis rotation vectors. The three-axis rotation vectors include "rv1=X*sin(θ/2)", "rv2=Y*sin(θ/2)" and "rv3=Z*sin(θ/2)", "θ" represents a rotation angle of the electronic device 1. The unlocking system 10 may unlock the electronic device 1 by detecting rotation operations on the electronic device 1 according to a theory of fuzzy logic.

The at least one processor 11 executes one or more computerized codes and other applications of the electronic device 1, to provide functions of the unlocking system 10. The storage system 12 stores data of the electronic device 1, such as, data of preset unlocking operation from a user of the electronic device 1. In one embodiment, the storage system 12 may be a memory, an external storage card, such as a smart media card, or a secure digital card.

Figure 2:
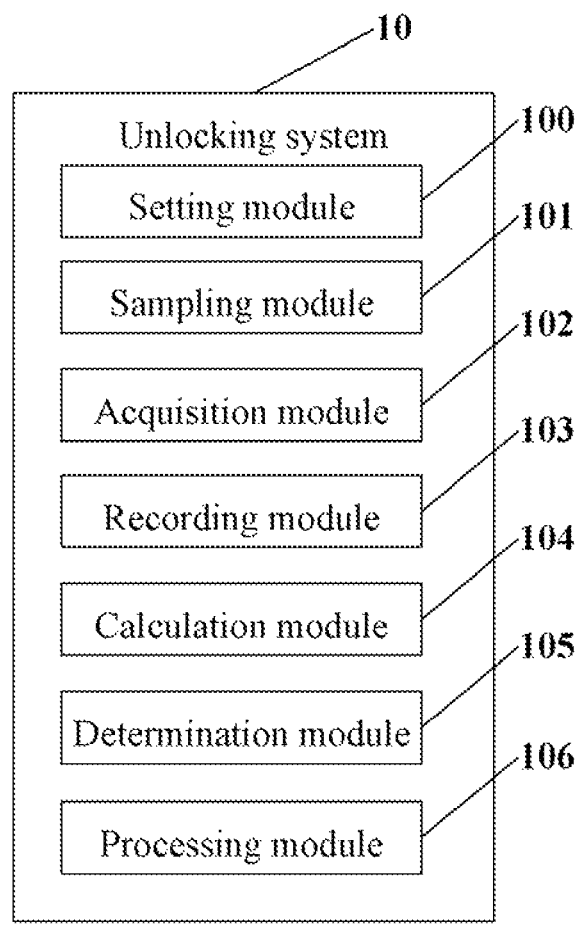
FIG. 2 is a block diagram of function modules of an unlocking system included in the electronic device of FIG. 1.

FIG. 2 is a block diagram of function modules of the unlocking system 10 included in the electronic device of FIG. 1. In the embodiment, the unlocking system 10 may include a setting module 100, a sampling module 101, an acquisition module 102, a recording module 103, a calculation module 104, a determination module 105, and a processing module 106. The modules 100-106 comprise computerized codes in the form of one or more programs that are stored in the storage system 12. The computerized codes include instructions that are executed by the at least one processor 11 to provide functions for the modules. Details of each of the modules will be given in FIG. 3 and FIG. 4.

Figure 3:
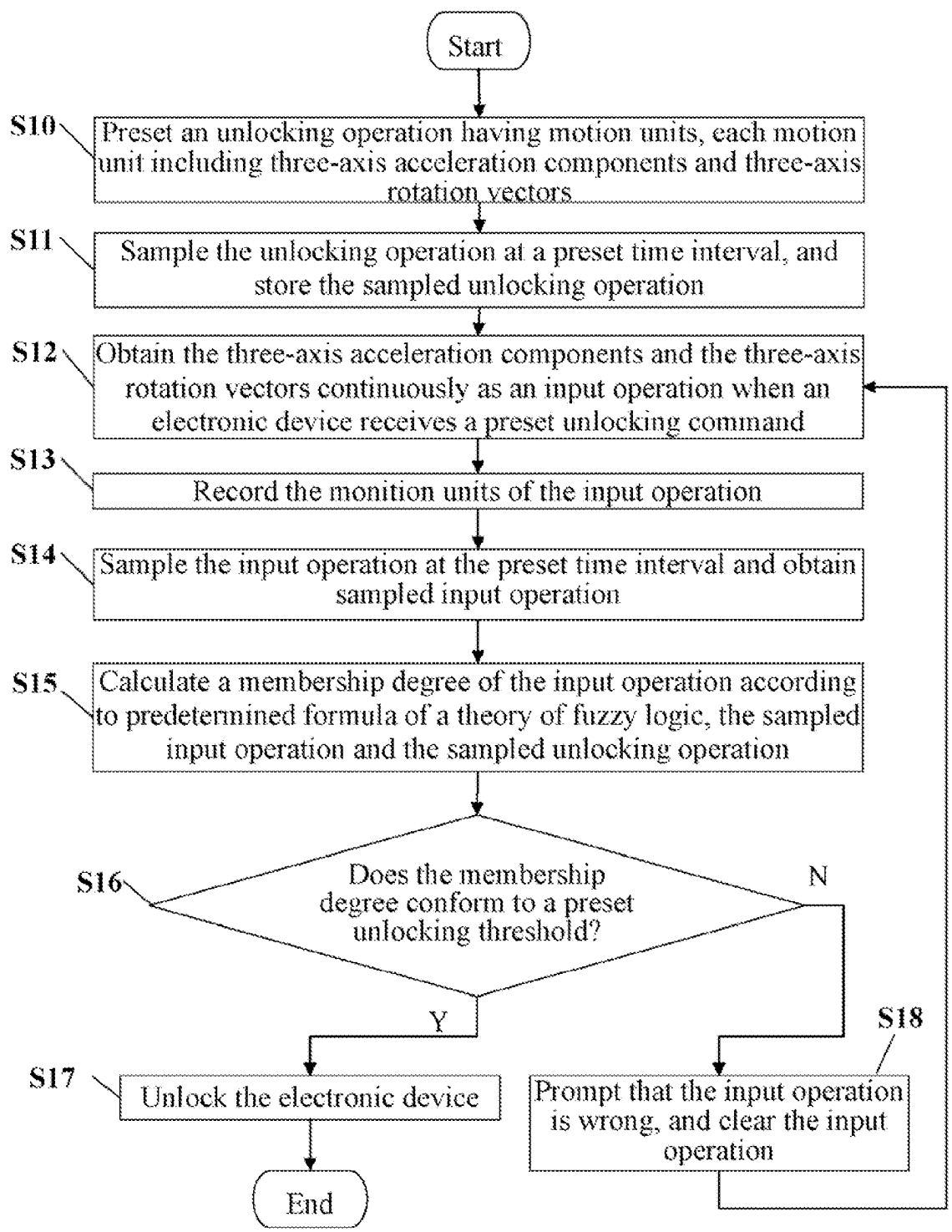
FIG. 3 is a flowchart of one embodiment of a method for processing point cloud using the electronic device of FIG. 1.

FIG. 3 is a flowchart of one embodiment of a method for unlocking the electronic device of FIG. 1. Depending on the embodiment, additional steps may be added, others deleted, and the ordering of the steps may be changed.

In step S10, the setting module 100 presets an unlocking operation having motion units, and stores the unlocking operation into the storage system 12. Each of the motion units includes three-axis acceleration values and three-axis rotation vectors. In one embodiment, the user of the electronic device 1 may preset a moving operation or a rotating operation of the electronic device 1 as the unlocking operation. After the user chooses to start presetting the unlocking operation (e.g. trigger a command of setting the unlock operation), the first sensor 13 detects the three-axis acceleration values and the second sensor 14 detects the three-axis rotation vectors of the electronic device 1. The setting module 100 records the three-axis acceleration values and the three-axis rotation vectors of each point to be one motion unit, and obtains a plurality of motion units as the unlocking operation. In some embodiments, the unlocking operation is determined to be finished when no more three-axis acceleration values and three-axis rotation vectors are acquired/received from the first sensor 13 and the second sensor 14. In other embodiments, if the three-axis acceleration values and the three-axis rotation vectors do not change in a preset short time (e.g. 1 second), the unlocking operation may be determined to be finished. The unlocking operation may be limited to finish in a preset time, such as 5 seconds.

For example, a motion unit is expressed as "{a1, a2, a3, rv1, rv2, rv3}". The "a1, a2, a3" are the three-axis acceleration values, and the "rv1, rv2, rv3" are the three-axis rotation vectors. In order to speed the processing of data of the plurality of the motion units, the three-axis acceleration value "a3" can be set to be "1" if the three-axis acceleration value "a3" is at a positive orientation along the z-axis. The three-axis acceleration value "a3" may set to be "−1" if the three-axis acceleration value "a3" is at a negative orientation along the z-axis.

In step S11, the sampling module 101 samples the unlocking operation at a preset time interval (e.g. 0.005 seconds), and stores sampled unlocking operation into the storage system 12.

In step S12, when the user starts to unlock the electronic device 1 by triggering a preset unlocking command of the electronic device 1, the acquisition module 102 starts to obtain the three-axis acceleration values and the three-axis rotation vectors continuously from the first sensor 13 and the second sensor 14 as an input operation. The preset unlocking command may be a virtual icon of unlocking displayed on the electronic device 1. In one embodiment, the input operation is determined to be finished when no more three-axis acceleration values and three-axis rotation vectors are acquired/received from the first sensor 13 and the second sensor 14. In other embodiments, if the three-axis acceleration values and the three-axis rotation vectors do not change in the preset short time, the input operation may be determined to be finished. The input operation also may be limited to finish in the preset time, such as 5 seconds.

In step S13, the recording module 103 records the motion units of the input operation. The method of recording the motion units of the input operation is the same as the method of presetting the unlocking operation.

In step S14, the sampling module 101 samples the input operation at the preset time interval and obtains sampled input operation. In one embodiment, a number of the motion units in the sampled unlocking operation are equal to a number of the motion units in the sampled input operation.

In step S15, the calculation module 104 calculates a membership degree of the input operation according to a predetermined formula of a theory of fuzzy logic, the sampled unlocking operation and the sampled input operation. The sampled unlocking operation is expressed by "PU={m1, m2, ..., mt}", "m" represents a motion unit in the sampled unlocking operation and "t" represents that the numbers of the motion units in the sampled unlocking operation. The sampled input operation is expressed by "PI={MI1, MI2, ..., MIt}", "MI" represents a motion unit in the sampled input operation. The predetermined formula is $$"D_f = \frac{\sum \mu(D_t) * D_t}{\sum D_t}".$$

Figure 4:
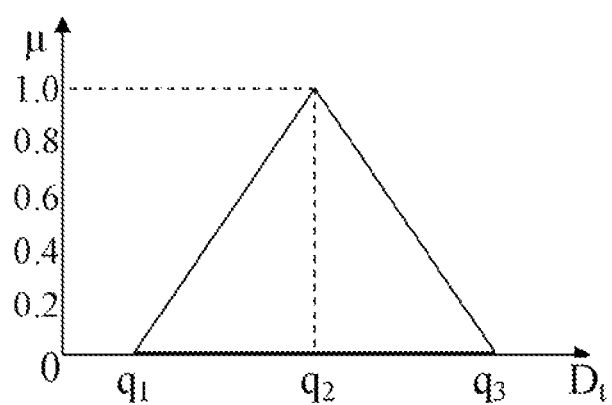
FIG. 4 is a schematic diagram of one embodiment of a triangular membership function.

In one embodiment, "$D_f$" represents the membership degree. "$D_t$" includes "$D_{tai}$" and "$D_{trvi}$", and "i" is equal to 1, 2, or 3 because each motion unit includes "a1, a2, a3" and "rv1, rv2, rv3". "$D_{tai}$" represents an absolute value of a difference between a three-axis acceleration value "ai" of the "tth" motion unit in the sampled unlocking operation and the three-axis acceleration value "ai" of the "tth" motion unit in the sampled input operation. "$D_{trvi}$" represents a vector difference between a three-axis rotation vector "rvi" of the "tth" motion unit in the sampled unlocking operation and a three-axis rotation vector "rvi" of the "tth" motion unit in the sampled input operation. "$\mu(D_t)$" is calculated by a triangular membership function. The triangular membership function is shown as following. "$\mu D_t$" represents $$\begin{cases} 0, & \text{for } D_t < q_1 \\ \frac{D_t - q_1}{q_2 - q_1}, & \text{for } a_1 \le D_t < q_2 \\ 1, & \text{for } D_t = q_2 \\ \frac{q_3 - D_t}{q_3 - q_2}, & \text{for } q_2 < D_t \le q_3 \\ 0, & \text{for } D_t > q_3 \end{cases},$$

and a value range of "$\mu D_t$" is from 0 to 1. The triangular membership function is shown in FIG. 4. In one embodiment, each of "$\mu(D_{ta1})$", "$\mu(D_{ta2})$", "$\mu(D_{ta3})$", "$\mu(D_{trv1})$", "$\mu(D_{trv2})$" and "$\mu(D_{trv3})$" corresponds to respective predetermined "$q_1$", "$q_2$", and "$q_3$". In some embodiments, the triangular membership function for each of the "$\mu(D_{ta1})$", "$\mu(D_{ta2})$", "$\mu(D_{ta3})$", "$\mu(D_{trv1})$", "$\mu(D_{trv2})$" and "$\mu(D_{trv3})$" may be different.

In step S16, the determination module 105 determines whether the calculated membership degree of the input operation conforms to a preset unlocking threshold. In one embodiment, the unlocking operation has a preset unlocking threshold with a preset level. The preset unlocking threshold includes a group of a lower level, a low level, a middle level, a higher level, and a high level. Each level corresponds to a range of the membership degrees. The range of the membership degrees is from 0 to 1. If the value of the calculated degree is in the range of a preset level, the determination module 105 determines that the calculated degree of the input operation conforms to the preset unlocking threshold, and step S17 is implemented. If the value of the calculated degree is not in the range of the preset level, the determination module 105 determines that the calculated degree does not conform to the preset unlocking threshold, and step S18 is implemented.

In one embodiment, the lower level corresponds the range of the membership degrees of [0-0.2]. The low level corresponds to the numerical range of the membership degrees of [0.21-0.4]. The middle level corresponds to the numerical range of the membership degrees of [0.41-0.6]. The higher level corresponds to the numerical range of the membership degrees of [0.61-0.8]. The high level corresponds to the numerical range of the membership degrees of [0.81-1]. In some embodiments, higher unlocking threshold corresponds to a greater allowable error range. Therefore, if the unlocking operation is complicated, the preset level can set to the high level. The preset level can be set according to user preferences.

In step S17, the processing module 106 unlocks the electronic device 1, and the procedure ends.

In step S18, the processing module 106 prompts the user of the electronic device 1 that the input operation is wrong, and clears the input operation, and step S12 is implemented.

In one embodiment, the processing module 106 may display a prompt message or play a prompt tone to prompt the user.

All of the processes described above may be embodied in, and be fully automated via, functional code modules executed by one or more general-purpose processors. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included herein within the scope of this disclosure and the described inventive embodiments, and the present disclosure is protected by the following claims.

What is claimed is:

1. A computer-implemented method for unlocking an electronic device, the method comprising:

presetting a unlocking operation having motion units, each of the motion units comprising three-axis acceleration values and three-axis rotation vectors of the electronic device, the three-axis acceleration values being detected by a first sensor of the electronic device and the three-axis rotation vectors being detected by a second sensor of the electronic device;

sampling the unlocking operation at a preset time interval, and storing the sampled unlocking operation into a storage system of the electronic device;

obtaining the three-axis acceleration values and the three-axis rotation vectors continuously from the first sensor and the second sensor as an input operation, when the electronic device receives a preset unlocking command to unlock the electronic device;

recording motion units of the input operation;

sampling the input operation at the preset time interval as sampled input operation; calculating a membership degree of the input operation according to a predetermined formula of a theory of fuzzy logic, the sampled unlocking operation, and the sampled input operation, wherein the membership degree is calculated according to an absolute value of a difference between a three-axis acceleration value of each motion unit in the sampled unlocking operation and a three-axis acceleration value of a corresponding motion unit in the sampled input operation, a triangular membership function of each of the absolute value, a vector difference between a three-axis rotation vector of each motion unit in the sampled unlocking operation and a three-axis rotation vector of the corresponding motion unit in the sampled input operation, and the triangular membership function of each vector difference;

unlocking the electronic device when the membership degree of the input operation conforms to a preset unlocking threshold.

2. The method according to claim 1, further comprising: prompting that the input operation is wrong and clearing the input operation, if the membership degree of the input operation does not conform to the preset unlocking threshold.

3. The method according to claim 1, wherein the preset unlocking threshold comprises a group of a lower level, a low level, a middle level, a higher level, and a high level, each level in the group corresponds to a range of the membership degrees.

4. The method according to claim 1, wherein a number of the motion units in the sampled unlocking operation is equal to a number of the motion units in the sampled input operation.

5. The method according to claim 1, wherein the first sensor is a three-axis acceleration sensor, and the second sensor is a three-axis gyroscope.

6. A non-transitory storage medium storing a set of instructions, when executed by at least one processor of an electronic device, cause the at least one processor to perform a method for unlocking the electronic device, the method comprising:

presetting an unlocking operation having motion units, each of the motion units comprising three-axis acceleration values and three-axis rotation vectors of the electronic device, the three-axis acceleration values being detected by a first sensor of the electronic device and the three-axis rotation vectors being detected by a second sensor of the electronic device;

sampling the unlocking operation at a preset time interval, and storing the sampled unlocking operation into a storage system of the electronic device;

obtaining the three-axis acceleration values and the three-axis rotation vectors continuously from the first sensor and the second sensor as an input operation, when the electronic device receives a preset unlocking command to unlock the electronic device;

recording the motion units of the input operation;

sampling the input operation at the preset time interval as sampled input operation;

calculating a membership degree of the input operation according to a predetermined formula of a theory of fuzzy logic, the sampled unlocking operation and the sampled input operation, wherein the membership degree is calculated according to an absolute value of a difference between a three-axis acceleration value of each motion unit in the sampled unlocking operation and a three-axis acceleration value of a corresponding motion unit in the sampled input operation, a triangular membership function of each of the absolute value, a vector difference between a three-axis rotation vector of each motion unit in the sampled unlocking operation and a three-axis rotation vector of the corresponding motion unit in the sampled input operation, and the triangular membership function of each vector difference;

unlocking the electronic device when the membership degree of the input operation conforms to a preset unlocking threshold.

7. The non-transitory storage medium according to claim 6, further comprising:

prompting that the input operation is wrong and clearing the input operation, if the membership degree of the input operation does not conform to the preset unlocking threshold.

8. The non-transitory storage medium according to claim 6, wherein the preset unlocking threshold comprises a group of a lower level, a low level, a middle level, a higher level, and a high level, each level in the group corresponds to a range of the membership degrees.

9. The non-transitory storage medium according to claim 6, wherein a number of the motion units in the sampled unlocking operation is equal to a number of the motion units in the sampled input operation.

10. The non-transitory storage medium according to claim 6, wherein the first sensor is a three-axis acceleration sensor, and the second sensor is a three-axis gyroscope.

11. An electronic device, comprising:
a first sensor for detecting three-axis acceleration values and a second sensor for detecting three-axis rotation vectors of the electronic device;
a storage system;
at least one processor; and
one or more programs that are stored in the storage system and executed by the at least one processor, the one or more programs comprising:
a setting module that presets an unlocking operation having motion units, each of the motion units comprising the three-axis acceleration values and the three-axis rotation vectors of the electronic device;
a sampling module that samples the unlocking operation at a preset time interval, and stores the sampled unlocking operation into the storage system;
an acquisition module that obtains the three-axis acceleration values and the three-axis rotation vectors continuously from the first sensor and the second sensor as an input operation, when the electronic device receives a preset unlocking command to unlock the electronic device;

a recording module that records the motion units of the input operation;

the sampling module further samples the input operation at the preset time interval as sampled input operation;

a calculation module that calculates a membership degree of the input operation according to a predetermined formula of a theory of fuzzy logic, the sampled unlocking operation and the sampled input operation, wherein the membership degree is calculated according to an absolute value of a difference between a three-axis acceleration value of each motion unit in the sampled unlocking operation and a three-axis acceleration value of a corresponding motion unit in the sampled input operation, a triangular membership function of each of the absolute value, a vector difference between a three-axis rotation vector of each motion unit in the sampled unlocking operation and a three-axis rotation vector of the corresponding motion unit in the sampled input operation, and the triangular membership function of each vector difference;

a processing module that unlocks the electronic device when the membership degree of the input operation conforms to a preset unlocking threshold.

12. The electronic device according to claim 11, wherein the processing module further prompting that the input operation is wrong and clearing the input operation, if the membership degree of the input operation does not conform to the preset unlocking threshold.

13. The electronic device according to claim 11, wherein the preset unlocking threshold comprises a group of a lower level, a low level, a middle level, a higher level, and a high level, each level in the group corresponds to a range of the membership degrees.

14. The electronic device according to claim 11, wherein a number of the motion units in the sampled unlocking operation is equal to a number of the motion units in the sampled input operation.

15. The electronic device according to claim 11, wherein the first sensor is a three-axis acceleration sensor and the second sensor is a three-axis gyroscope.

* * * * *